United States Patent [19]

Chiesa et al.

[11] Patent Number: 4,654,778
[45] Date of Patent: Mar. 31, 1987

[54] DIRECT PARALLEL PATH FOR STORAGE ACCESSES UNLOADING COMMON SYSTEM PATH

[75] Inventors: George L. Chiesa, Raleigh, N.C.; Matthew A. Krygowski, Hopewell Junction, N.Y.; Benedicto U. Messina, Poughkeepsie, N.Y.; Theodore A. Papanastasiou, Hyde Park, N.Y.

[73] Assignee: International Business Machines Corporation, Armonk, N.Y.

[21] Appl. No.: 625,380

[22] Filed: Jun. 27, 1984

[51] Int. Cl.⁴ .................... G06F 13/40; G06F 13/18
[52] U.S. Cl. .............................................. 364/200
[58] Field of Search ...................... 364/200 MS File

[56] References Cited

U.S. PATENT DOCUMENTS

| | | | |
|---|---|---|---|
| 4,476,524 | 10/1984 | Brown et al. | 364/200 |
| 4,480,306 | 10/1984 | Bachman et al. | 364/200 |
| 4,495,567 | 1/1985 | Treen | 364/200 |
| 4,503,497 | 3/1985 | Krygowski et al. | 364/200 |

Primary Examiner—Archie E. Williams
Assistant Examiner—Michael J. Ure
Attorney, Agent, or Firm—Bernard M. Goldman

[57] ABSTRACT

A fast path (comprising control and data busses) directly connects between a storage element in a storage hierarchy and a requestor. The fast path (FP) is in parallel with the bus path normally provided through the storage hierarchy between the requestor and the storage element controller. The fast path may bypass intermediate levels in the storage hierarchy. The fast path is used at least for fetch requests from the requestor, since fetch requests have been found to comprise the majority of all storage access requests. System efficiency is significantly increased by using at least one fast path in a system to decrease the peak loads on the normal path. A requestor using the fast path makes each fetch request simultaneously to the fast path and to the normal path in a system controller element (SCE). The request through the fast path gets to the storage element before the same request through the SCE, but may be ignored by the storage element if it is busy. If accepted, the storage element can start its accessing controls sooner for a fast path request, than if the request is received from the normal path. Every request must use SCE controlled cross-interrogate (XI) and storage protect (SP) resources. Fast path request operation requires unique coordination among the XI and SP controls, the SCE priority controls, and by the storage element priority controls. When the accessed data is ready to be sent by the storage element, it can be sent to the requestor faster on the fast path data bus than on the SCE data bus. The fast path data bus may be used to transfer data for requests ignored from the fast path.

16 Claims, 15 Drawing Figures

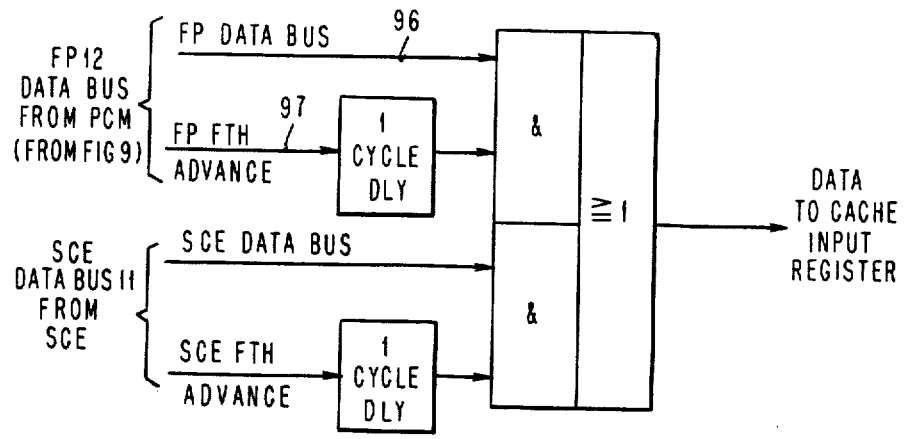
FIG. 3 (FP & SCE BUS CONNECTIONS TO CPU1)
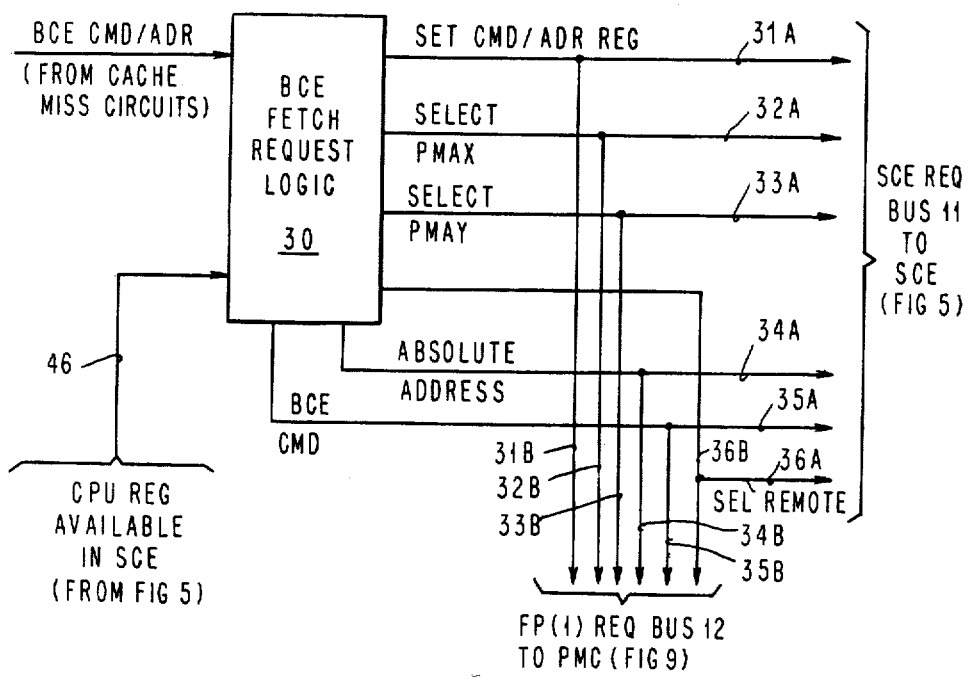
FIG. 4 (FP & SCE REQUEST BUS CONNECTION TO CPU1)

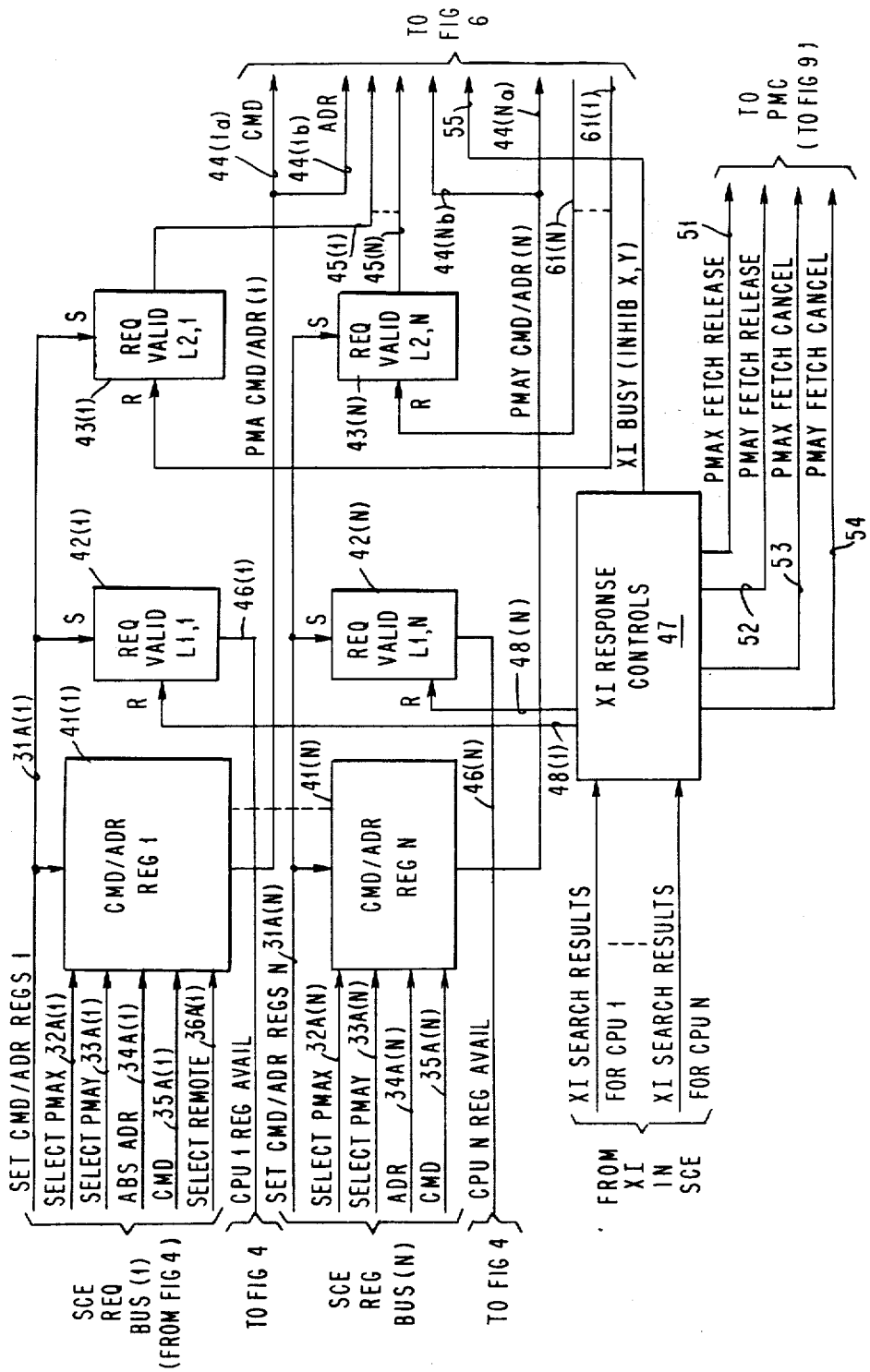
FIG. 5 (SCE INPUT CONTROLS)

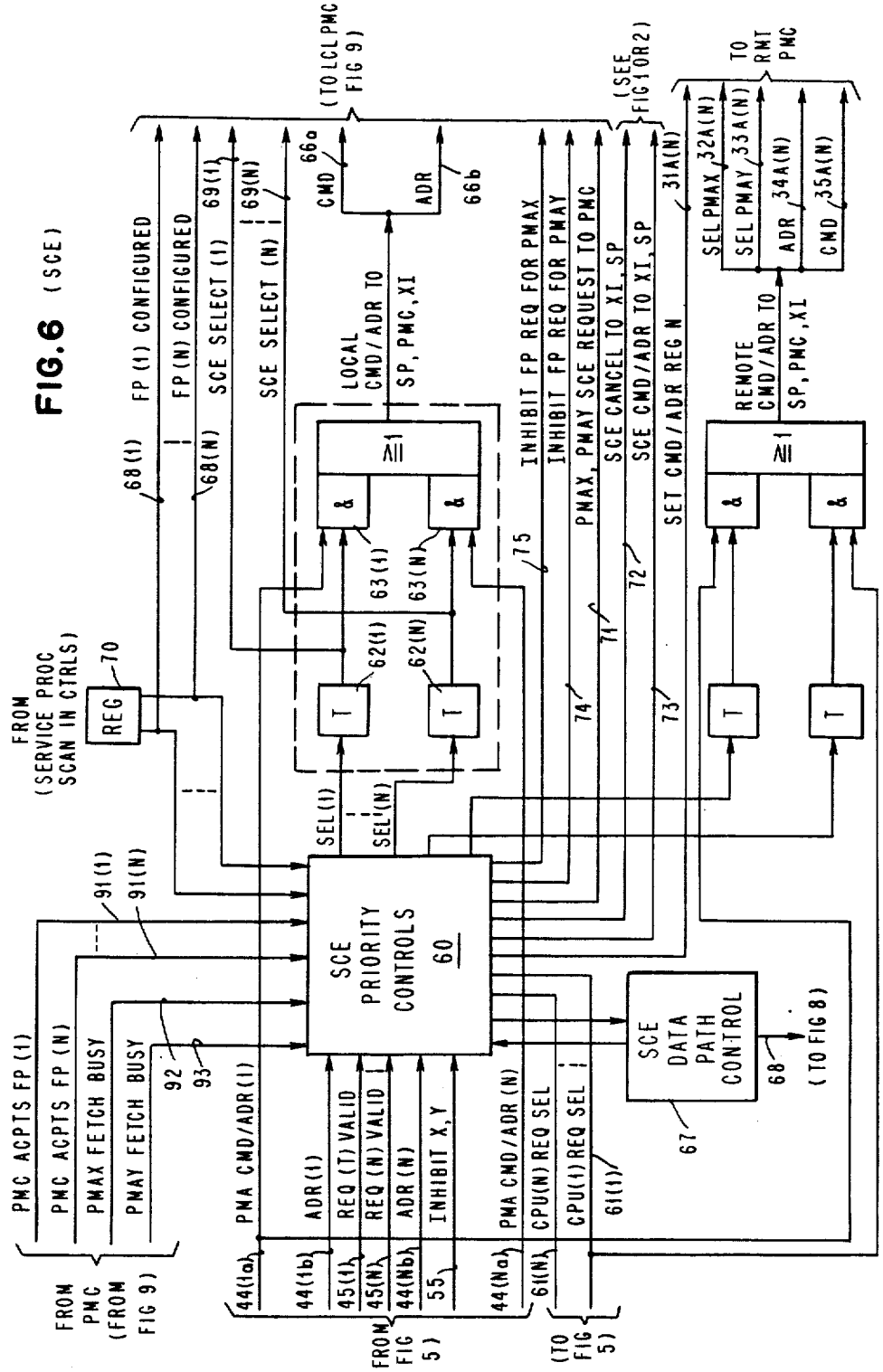
FIG. 6 (SCE)

(LINE FETCH USING ONLY SCE PATH)

(LINE FETCH USING FAST PATH)

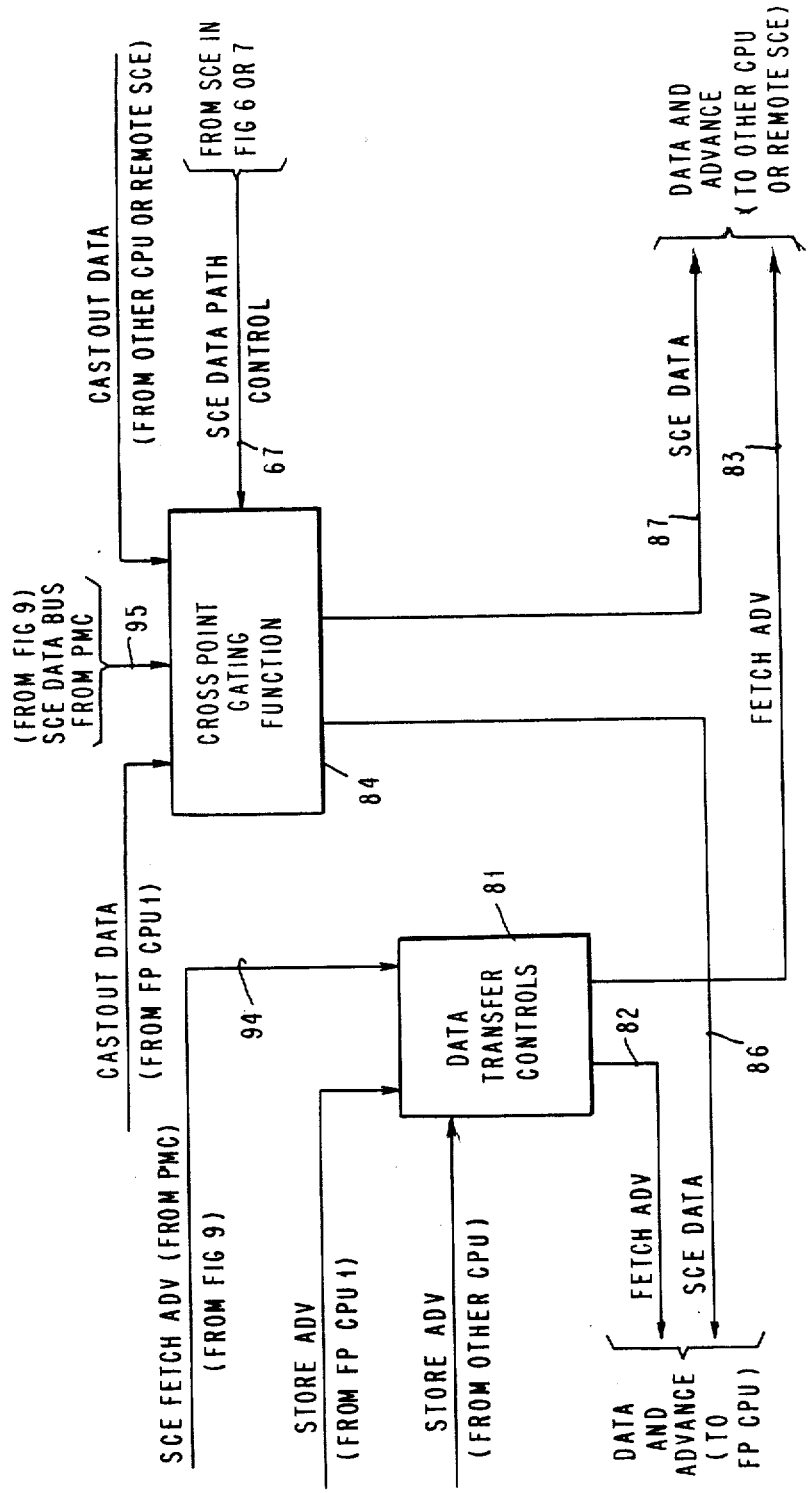
FIG. 8 (SCE DATA PATH) PRIOR ART

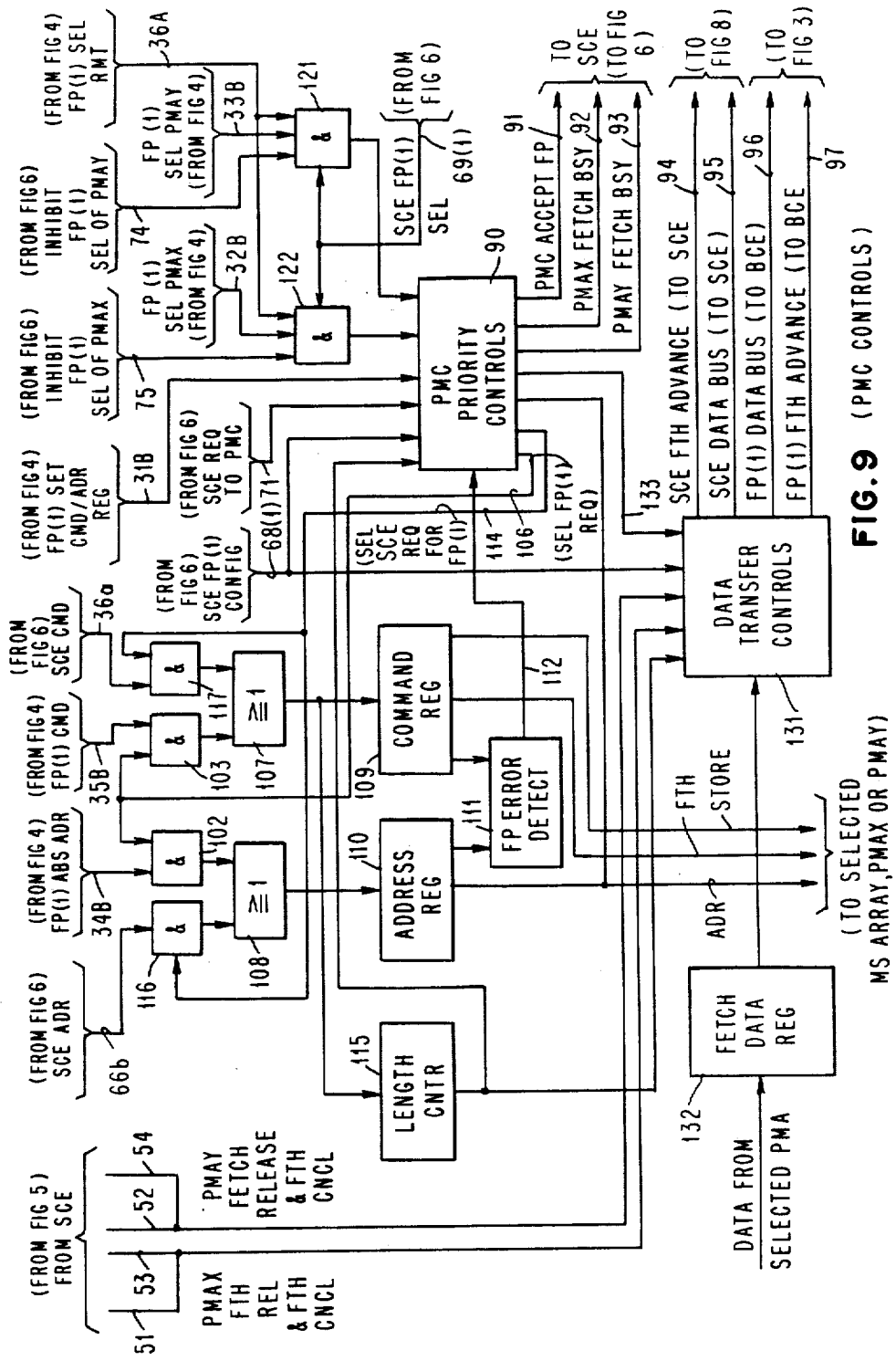
FIG. 9 (PMC CONTROLS)

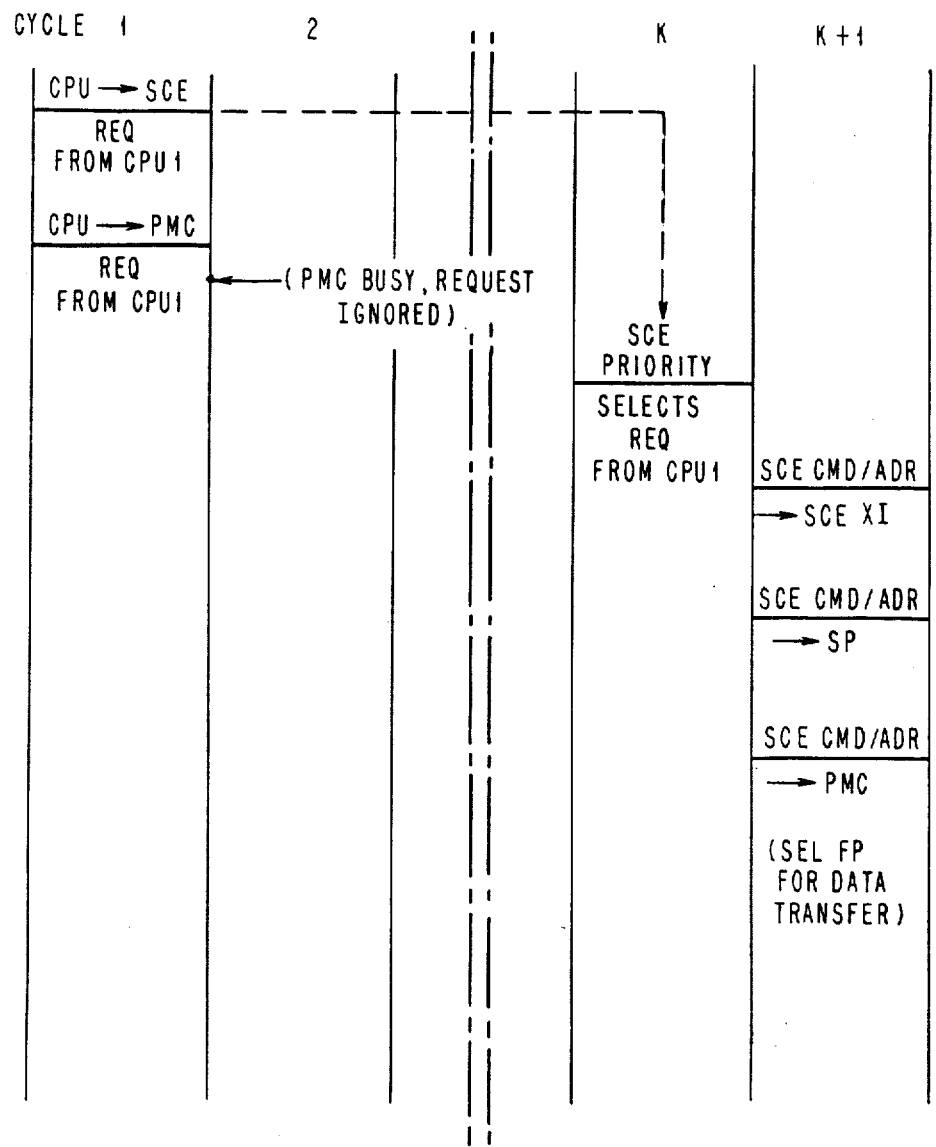
FIG. 10  PMC IGNORES FP FETCH REQUEST, AND SCE COMPLETES THE REQUEST.

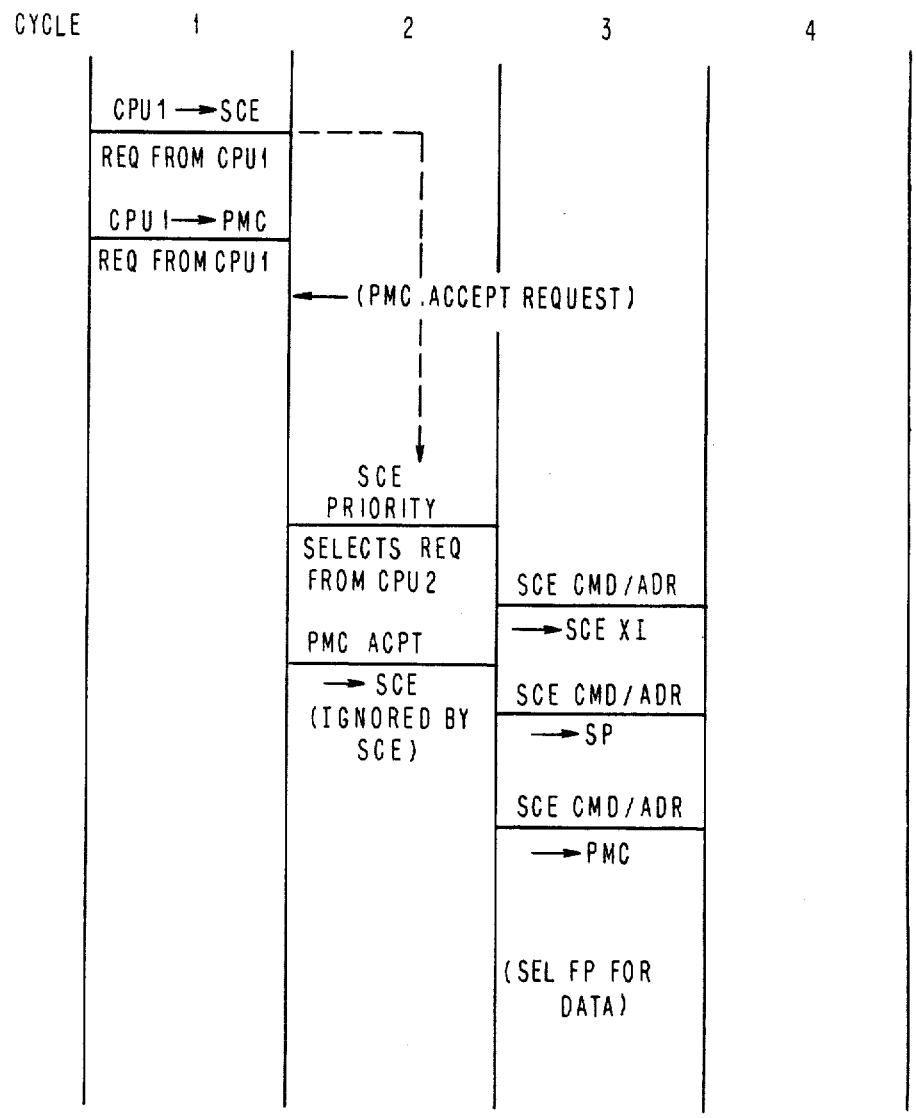
FIG. 11  PMC AND SCE OPERATIONS WHEN PMC ACCEPTS FP REQUEST.
(NO CONTENTION CASE.)
NOTE: SCE PRIORITY SELECTION IS BASED ON REQUEST IT RECEIVES IN PRIOR CYCLE.

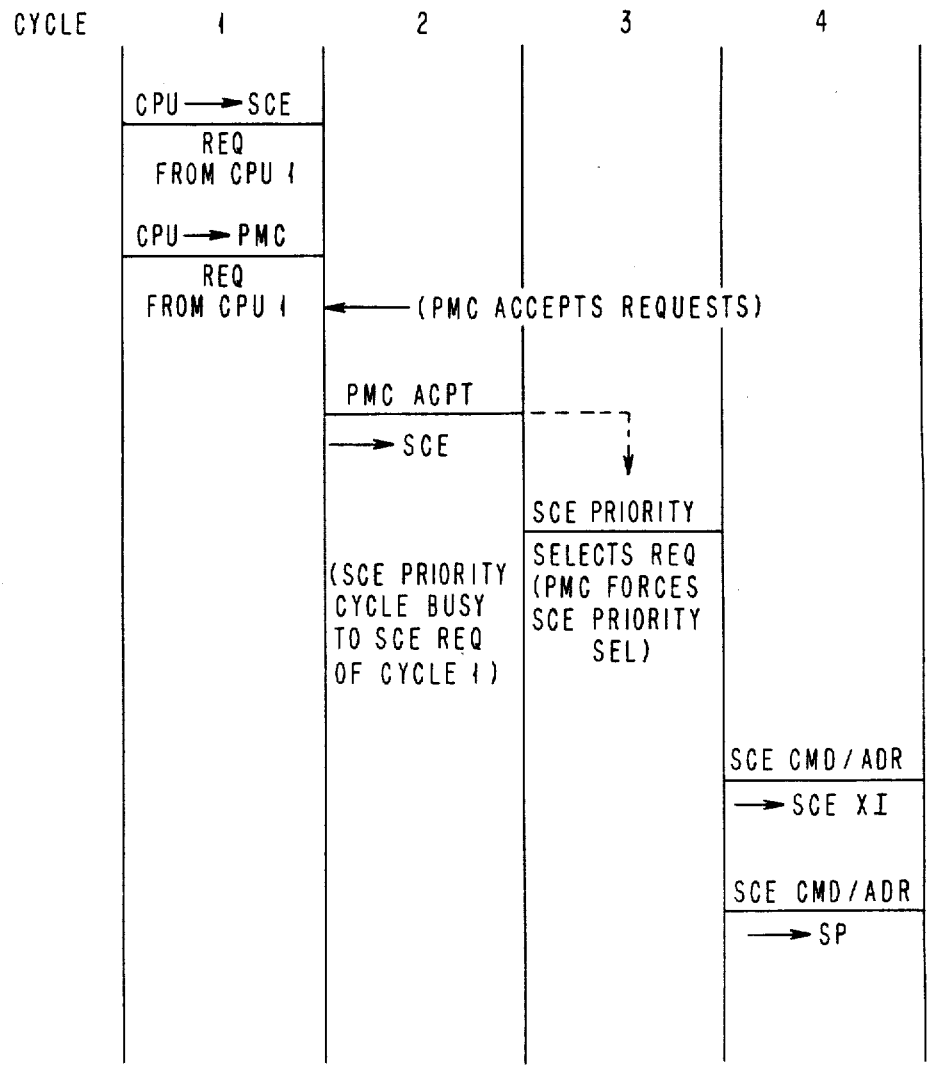
FIG.12 (SCE USES PMC ACCEPT SIGNAL TO FORCE PRIORTY OF XI & SP FOR THE REQ DUE TO BUSY SCE PRIORITY CYCLE)

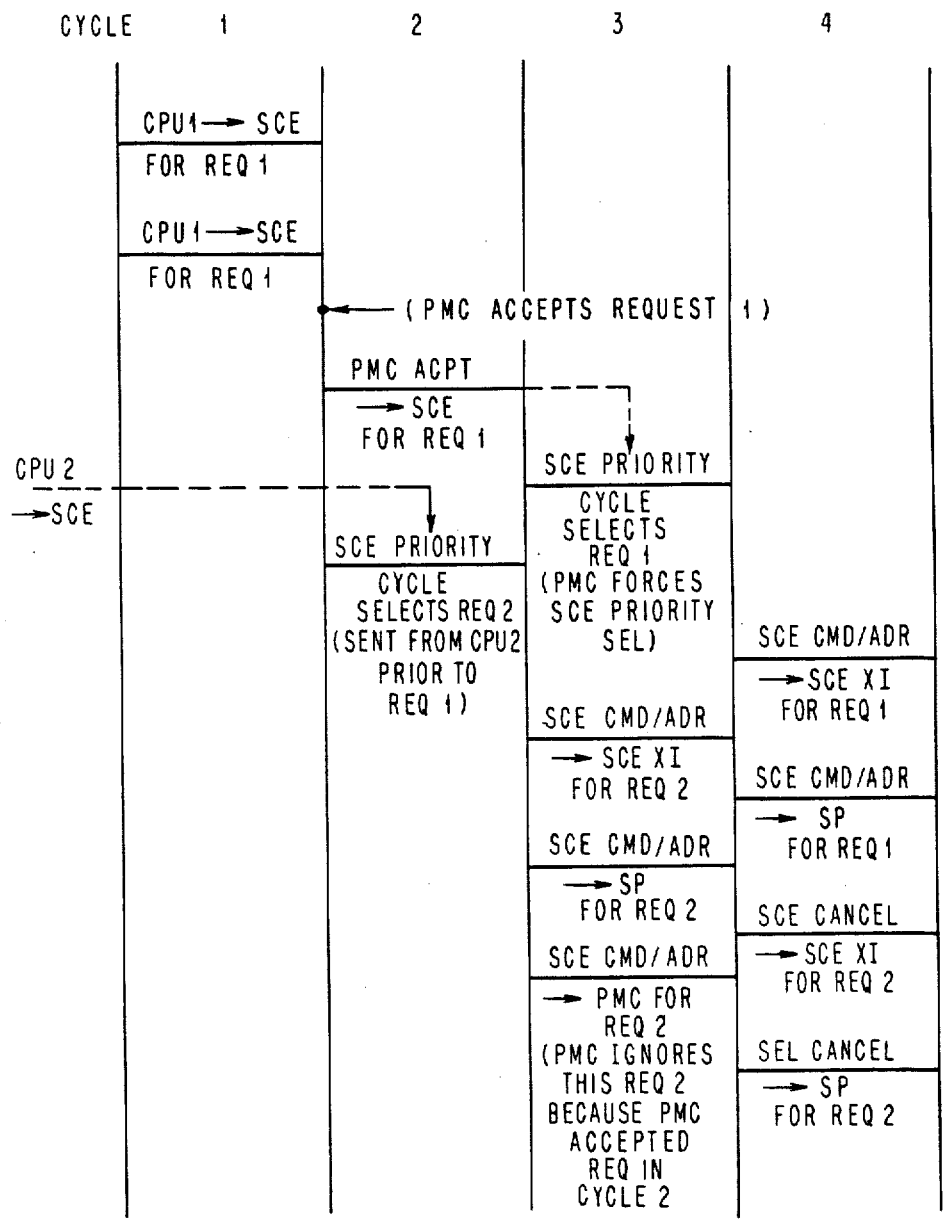
FIG. 14 (XI, SP CANCELLATION FOR NORMALLY HIGHER PRIORITY REQ DUE TO FORCED HIGHER PRIORITY BY PMC ACCEPT OF FP CPU REQ – SCE PRIORITY CONTROLS NOT

DIRECT PARALLEL PATH FOR STORAGE ACCESSES UNLOADING COMMON SYSTEM PATH

The subject invention relates to a novel fast path for storage accesses by a processor in a complex data processing system.

CROSS REFERENCE TO RELATED APPLICATIONS

Multiprocessor systems (MPs) have a plurality of central processing units (CPUs) which can access the same main storage (MS). Storage requests are asynchronous by the plural operating CPUs to the same main storage arrays. The processor requests to MS are coordinated by a system controller element (SCE or SC) which contains priority circuits that determine the priorities among the different types of storage access requests (e.g. store, fetches, commands, etc.) from the different processors, so that access requests can be serially presented in the correct order to each main storage array.

Main storage also has a main storage controller which receives the access requests from the SCE and controls the accessing operations by the requests in each of plural main storage arrays. The MS controller uses its own MS priority circuits which operate independently of the SCE priority circuits.

Furthermore, the SCE functions support store-in-caches (SICs) located with each CPU in order to improve system performance by reducing the frequency of accesses to the slower main storage arrays. The use of SICs caused the possibility that lines of data in any SIC may be changed in relation to the same lines of data in main storage. The result is that each processor fetch or store request to its SIC must be insured that the request is accessing the most updated copy of any requested line of data. Update coordination is done by cross-interrogation (XI) hardware connecting among the SICs. U.S. Pat. No. 4,394,731 (Flusche et al) describes cross-interrogation among CPUs having SICs.

Also, storage protect (SP) arrays are provided in each SCE to enable each line access request to check a storage protect key (assigned to the page frame containing the requested line of data) to determine if the access request violates a security requirement before the fetch access is allowed to be sent from main storage. U.S. Pat. No. 4,923,910, (Flusche et al) describes SP arrays provided in a SCE.

Hence, each SCE includes priority controls, XI and SP circuits, other MP storage controls, request control busses, and data busses between MS and the connected CPUs, I/O processor, and any remote SCE.

Also the efficiency of any processor obtaining a requested line of data changed in another CPU cache is improved by cache-to-cache and cache-to-channel line transfers described in U.S. patent application Ser. No. 382,842 filed 5/27/82 by M. A. Krygowski et al entitled "Independent Cache-to-Cache Transfer Means", now U.S. Pat. No. 4,503,497, and assigned to the same assignee as this application.

As storage hierarchies increase their number of levels and become more complex in MP environments, the number of machine cycles increases for each storage request which requires accessing a more distant part of the hierarchy, e.g. CPU request to MS. The subject invention deals with this problem.

BRIEF SUMMARY OF THE INVENTION

The subject invention has found a way to reduce a requestor's access time to distant storage in a storage hierarchy while maintaining all of the essential functions needed by each storage access. The subject invention may be used in a uniprocessor system, but is particularly applicable to multiprocessor systems (MPs). The invention provides a fast path (comprising a control and/or a data buss) directly between a storage element being accessed and the requestor in parallel with the control and data busses normally provided between the requestor and the storage element in a hierarchy which may be remote from the requestor, e.g. main storage. The fast path is used at least for fetch requests from the requestor, since fetch requests have been found to comprise about 75% of all storage access requests. System performance is not significantly decreased by not using the fast path for store (write) requests to the storage element, but the complexity of the fast path hardware requirements would be significantly increased.

Accordingly, when a CPU makes a fetch request for a line of data from a storage element using a fast path, the request is made by the CPU simultaneously to the fast path and to the normal path in a system controller element (SCE). The request to the fast path gets to the storage element in less cycles than the same request through the SCE. The result is that the storage element can start its accessing controls sooner for the request accepted from the fast path, even though the request also uses cross interrogate (XI) and storage protect (SP) resources which may be initated by the request on the SCE path. Requests accepted from the fast path use fewer machine cycles than the same request using the normal SCE path. When the accessed data is ready to be sent by main storage, it can be sent to the requestor faster on the fast path data bus than on the SCE data bus. The fast path data bus may be also used to speed up accesses for requests not accepted from the fast path, but accepted later from the SCE path. Thus, the use of a fast path significantly decreases access time for a request by reducing the number of machine cycles when compared to accessing the same request entirely through the SCE.

The XI and SP processing in the SCE for a fast path accepted request proceed in parallel with the accessing of the data in the storage element. During XI and SP processing, the SCE provides a fast path inhibit signal to the storage element to prevent it from accepting any new fast path request, since a new fast path request could not be serviced by the SCE until both its XI and SP circuits become available for another request.

If the SCE detects a conflict for a request in its XI circuits (requested data in transit to storage), it detects a more recent version of the requested data in a CPU's cache, or its SP circuits detect that the request is not authorized, then the SCE sends a cancel signal to the storage element to cancel the access for this request. For conflicts, the SCE repeats the cancelled request, so that the repeated request may proceed to successful completion without cancellation and obtain the requested data.

Storage element priority circuits are modified by the invention to provide a lower priority for fetch requests received from the fast path than for requests received from the SCE. The reason is that the SCE can queue requests when the storage element is busy, which are then delayed in the SCE awaiting the availability of the storage element. Requests are not queued (i.e. delayed) in the fast path. The SCE may contain time dependent requests which must be serviced immediately, e.g. I/O requests. The SCE requests must not be locked out by a succession of requests on the fast path. This problem is solved by giving the SCE requests higher storage priority than fast path requests. This priority enables the fast path requests to be accepted by the fast path only when there are not delayed SCE requests. Whenever a fast path request is not accepted by the storage element, MS, its corresponding SCE request is queued in the SCE.

Each time the storage priority circuits accept a fast path request, the storage controller must signal the fast path acceptance to the SCE, so that the SCE can make available its XI and SP resources for the request selected by the storage priority circuits and can cancel the concurrent SCE request selection of any other CPU, I/O processor, or remote SCE, which is then delayed in the SCE. This avoids the difficulties of out of sequence XI directory updates and delays in XI responses.

The storage priority circuits reject requests for a particular storage array while it is busy or inhibited. Then no fast path acceptance signal is sent by the storage controller to the SCE, so that during this time fetch requests sent to the SCE are received, queued, and later sent to the storage controller by the SCE in its normal manner, rather than by the fast path. However, the fast path may still be used for delayed requests by sending their fetched data on the fast path data bus to the requestor, instead of on the SCE data bus, so that the requestor gets the requested data faster than if the SCE data bus were used for the returned data.

Among processor requests, the SCE priority circuits are modified by the invention to give their highest priority to requests from a requestor using a fast path. Then if the corresponding fast path request is accepted by the storage priority circuits, the SCE immediately provides it XI and SP resources for the accepted FP request. However, if the SCE priority circuits are busy with a concurrent request from another requestor, a fast path accept signal received from the storage priority circuits forces the concurrent request to be cancelled, in order to give the XI and SP resources to the FP request. The cancelled SCE request remains in the SCE queue until it gets SCE priority, which is when it is serviced because it then gets highest priority in the storage priority circuits.

A plurality of fast paths may be provided in a system. Each fast path is dedicated to a particular requestor, e.g. CPU, I/O processor and remote SCE. Not all requestors in a system need have respective fast path. With a fast path implementation, performance is significantly improved for the entire system. This is because accessed data sent through the fast path uses less SCE resources, which enables each other CPU, I/O, or remote SCE request to have a greater likelihood of having SCE resources immediately available for servicing their requests. This reduces the system transmission load on the SCE and may prevent it from becoming a performance bottleneck during peak system loads.

Objects of this invention are to:

A. Provide a fast path for fetch requests to main storage (1) to enable quicker fetch accesses than for the same request through its normal fetch request path to main storage, and/or (2) to enable quicker fetch accesses regardless if the fetch request is accepted by main storage from either the fast path or the normal request path.

B. Cause a CPU to issue each fetch request in parallel to both a fast path and a normal system controller path, thereby allowing the system controller to process any fetch request through normal means whenever the main storage controller cannot accept a fast path request, which occurs if the fast path request has an error or if main storage is not available when the fast path request is received.

C. Distribute the priority control for fast path requests between a main storage controller and a system controller (SCE) so that:
1. Fast path requests can be accessed earlier in main storage when they are accepted by the main storage priority mechanism.
2. But when the same request cannot be accepted from the fast path, it is queued in the SCE as a normal SCE request for delayed handling, which will avoid requiring the requestor to resend the fetch request.
3. An accepted fast path request causes a contending concurrent SCE request to be queued by the system controller when it finds the XI or SP resource is being used by the concurrent SCE request.
4. When an SCE request (having its corresponding fast path request rejected by the MS controller) gets SCE priority, it requires MS to send its data over the fast path (and not through the SCE).

D. Send all data on the fast path to a requesting fast path requestor, regardless of whether the request was received by main storage from the fast path or from the system controller, thereby providing faster access for all fast path transmitted data, regardless of whether the FP request was accepted or rejected.

E. Enable the fast path to be reconfigured out of the system in case of a hard error in the fast path, enabling the system to continue operating satisfactorily at a slower rate.

F. Cause the system to give storage accessing priority preference to delayed SCE requests by rejecting FP requests while delayed SCE requests exist.

BRIEF DESCRIPTION OF THE DRAWINGS

FIG. 3 illustrates BCE hardware for a CPU embodiment having a fast path data bus port and a SCE data bus port for providing parallel data paths for each CPU request to main storage.

FIG. 4 illustrates BCE hardware for a CPU embodiment having a fast path request bus port and a SCE request bus port.

FIG. 5 illustrates a plurality of request ports of a system controller element (SCE) for connection to a plurality of requestors, e.g. CPUs, I/O processor, and/or remote SCE.

FIG. 6 illustrates priority controls within a system controller element (SCE) for supporting one or a plurality of fast paths.

FIG. 8 shows SCE data path hardware found in the prior art.

FIG. 9 illustrates a main storage controller (PMC) for supporting a fast path between any requestor and main storage.

FIG. 10 is a machine cycle timing diagram based on machine cycles showing the operation of the system when the main storage controller rejects a fetch request from a fast path, which requires that the system controller element to initiate the MS controller operations for the request.

FIG. 11 is a machine cycle timing diagram showing a forced SCE operation of the main storage controller and the system controller elements (SCE) when the main storage controller accepts a fast path request in which the corresponding SCE request has no contention in the system controller element.

FIG. 12 is a machine cycle timing diagram showing the operation when the main storage controller accepts a fast path request and the corresponding request in the system controller element has contention so that the SCE cannot immediately provide a priority cycle to it, in which case the fast path acceptance signal from the main storage controller forces the SCE priority circuits to service the corresponding fast path request by giving it the XI and SP resources.

FIG. 14 is similar to FIG. 13 except that in FIG. 14 the conflicting concurrent request received from another CPU gets a delayed SCE priority cycle while the fast path request acceptance is being received by the SCE, after which the fast path request is given SCE priority and the concurrent request is cancelled.

DETAILED DESCRIPTION OF THE PREFERRED EMBODIMENTS

Figure 1:
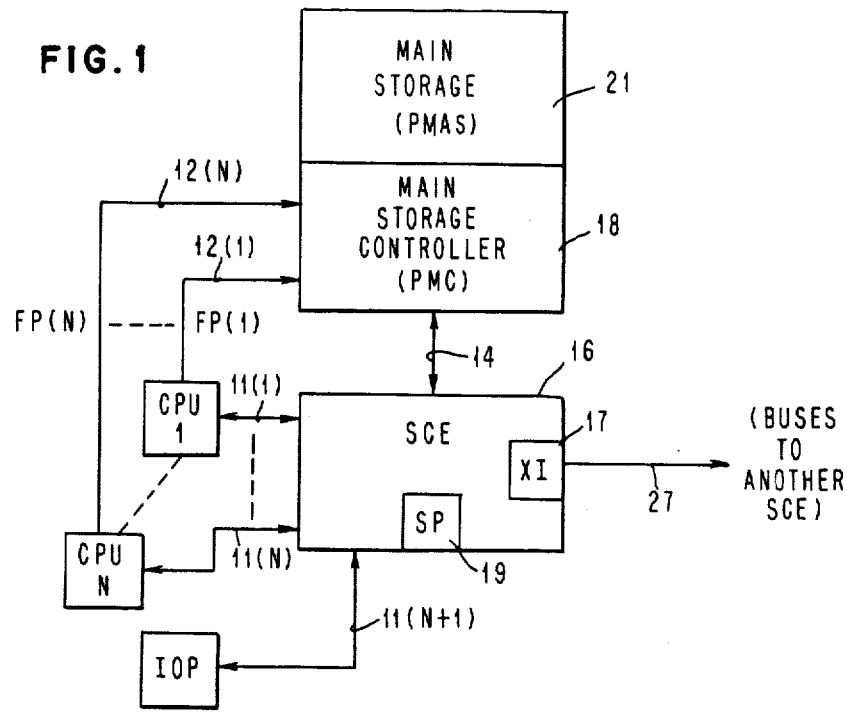
FIG. 1 illustrates a data processing system having fast paths connected between main storage (MS) and each of its central processing units (CPUs).

FIG. 1 illustrates a data processing system containing any number of CPUs 1 through N. This is inclusive of a uniprocessor system having only one CPU. A system controller element (SCE) is connected to each of the CPUs 1 through N through respective SCE request and data busses 11(1) through 11(N). A main storage controller (PMC) 18 is also connected to the system controller element through the SCE request and data busses 14.

An I/O processor (IOP) also has I/O request and data busses 11(N+1) connected between SCE 16 and the IOP. This represents a processor which does not have a direct path to main storage controls because of restrictions posed by timing or physical packaging constraints.

Cross-interrogate (XI) circuits 17 and storage protect circuits (SP) 19 are provided in SCE 16.

The PMC 18 controls a main storage 21 containing any number of storage arrays. In the embodiments, storage 21 contains two arrays, PMAX and PMAY.

In FIG. 1, a respective fast path 12 (comprising a request bus and a data bus) is connected between PMC 18 and each CPU. The fast paths 12(1) through 12(N) provide faster access time for line fetch requests from each CPU to main storage than is obtainable by a respective CPU through the SCE path 11, 16, 14 to main storage.

Figure 2:
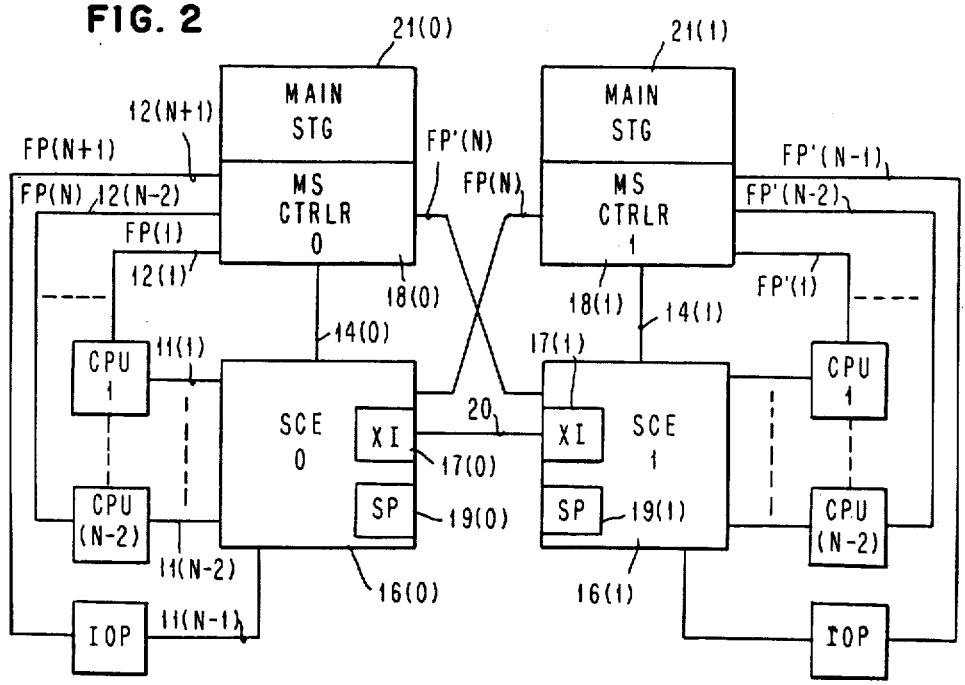
FIG. 2 illustrates a MP data processing system having a plurality of fast paths respectively connected between each MS element and each of its requestors, i.e. plural local CPUs, a local I/O processor, and a remote SCE, respectively.

FIG. 2 illustrates a multiprocessing system (MP) having two SCEs 0 and 1 having distributed main storage elements, 18(0), 21(0) and 18(1), 21(1). The SCEs are connected to each other by busses 20 which contain cross interrogation (XI) busses, request busses, and data busses for handling and communicating requests and data between the two SCEs. A "local" SCE, CPU, or IOP is a CPU, IOP or SCE connected to the MS element being addressed by a request. Either MS element may be addressed by any CPU or IOP in the system, if not local then through its locally connected SCE to the other SCE (called the remote SCE).

FIG. 2 adds two types of fast paths not found in FIG. 1. They are a fast path from the IOP to its local MS element, and a fast path from each remote SCE to each MS element. There are N number of fast paths (FPs) in FIG. 2 with FP(1) to FP(N-2) being for CPU(1) to CPU(N-2), FP(N-1) being for the I/O processor (IOP), and FP(N) being from the remote SCE16(1) to MS controller 18(0).

Each SCE 0 or 1 may have any number of CPUs including only one CPU. Hence, the two SCEs may have either a symmetrical or asymmetrical number of CPUs.

FIG. 4 illustrates an example of dual request ports in CPU(1) to a fast path 14 and to a SCE bus 11 for simultaneously sending a CPU fetch request to both the MS controller 18 and the SCE 16. This is done by having the conventional BCE request logic circuits split its output two ways to connect both to a SCE request bus in FIG. 5 and to fast path request inputs of the MS controller in FIG. 9. Every other requestor having a fast path in the system will likewise have dual ports, one to a fast path and the other to the normal path.

A dual CPU fetch request to the SCE and to the fast path is invoked by a cache miss in a cache directory in the buffer control element (BCE) of CPU(1) when the CPU makes a fetch or store request to a line, and the CPU's cache directory indicates that the line is not contained in the CPU's associated cache array. Then the BCE generates a command (CMD) and an absolute address (ADR) for the requested line in the main storage array to be selected, PMAX or PMAY, in local or remote main storage.

In FIG. 4, the absolute address is provided on a bus 34, and the BCE command is provided on bus 35. A set CMD/ADR register signal on a line 31 indicates when a command and address are on busses 34 and 35, in order to gate them into a CMD/ADR register 41 for the respective CPU in the SCE in FIG. 5, and to set on associated valid latches 42 and 43. An MS array selection signal on one of lines 32 or 33 in FIG. 4 also sets an array selection field in register 41 in FIG. 5. Lines 31A–35A provide the SCE port, and lines 31B–35B provide the FP port.

Although FIG. 1 shows fast paths on all CPUs, one or more of the CPUs may not have a fast path, in which case they do not have the set of lines 31B through 35B in FIG. 4, but only have lines 31A through 35A to the SCE. This may be caused by pragmatic conditions existing in the design of a system, such as lack of sufficient I/O pins in the hardware technology to support the addition of perhaps more than one fast path per SCE in the system. The same is true of distributed memory configurations as shown in FIG. 2. A CPU with a fast path connection to one main storage may not have a fast path to a remote main storage. It will therefore identify its request for a remote main storage through a select remote line.

FIG. 5 illustrates connections between an SCE and each of requestors (e.g. CPUs, an IOP, and any remote SCE in a system such as shown in FIG. 2). Thus, the SCE has N number of separate command/address registers 41 for each of the respective requestors to which it connects, in which registers 41(N−1) and 41(N) respectively connect to the SCE request busses of an IOP and a remote SCE.

Also in FIG. 5, request valid latches 42 and 43 are set on when their register 41 receives a request. Request valid latch 42 provides a signal back to the requestor to indicate that its request is validly being held in the associated command/address register 41. The other valid latch 43 provides an output on line 45 to the SCE priority controls 60 in FIG. 6 to request service by the SCE.

In FIG. 5, cross interrogate (XI) response controls 47 receive the XI search results for each request given priority service by the SCE. If all XI inputs indicate no updated version of the requested line is found in any other CPU cache (i.e. no update conflict), then a release signal is provided on line 51 or 52 for the appropriate MS array to indicate to the MS controller (PMC) that it can forward the data, when accessed, to the requestor. Also a reset signal 48 is provided to the associated request valid latch 42 to reset it when XI controls 47 reports that no XI conflict exists for the request.

On the other hand if the XI response controls 47 receive an update conflict signal on one of its input lines, then no reset is provided to latch 42, but a fetch cancel signal is provided on one of its output lines 53 or 54 for whichever MS array, PMAX or PMAY, is being used for the requested access to signal the MS controller that the request is being cancelled, and to start the access for the next MS request.

While XI controls 47 are busy with a request, an XI busy signal is provided on output line 55 to the SCE priority control 60 in FIG. 6, which causes it to output a signal on line 74 or 75 to inhibit any FP request for the associated MS array, PMAX or PMAY. The inhibit ends after the XI busy signal ends on line 55.

A request for remote main storage will not invoke XI activity in the local SCE, but will wait until the request is finally serviced in the remote SCE.

In FIG. 6, the SCE priority control may operate for a different request during each machine cycle to determine the priority among any concurrent requests in registers 41 in FIG. 5 being signalled by outputs of valid latches 43 in FIG. 5 to the SCE priority controls 60. These requests are presented from FIG. 5 for any one or more of up to N number of requestors (e.g. CPU's, I/O processor, and remote SCE).

The SCE priority controls 60 select the SCE resources available during each cycle by using all contending input requests received during the prior cycle, in the following order:

1. PMC forced requests,
2. I/O processor fetch and store requests in FIFO order,
3. Remote SCE fetch and store requests in FIFO order,
4. CPU fetch and store requests by CPU number in FIFO order.

A PMC forced request is provided by the MS controller (PMC) to the SCE when a fast path request is accepted by the MS controller, i.e. PMC accepts FP. A forced request is signalled on any one or more of lines 91(1) through 91(N). A forced request signal on any line 91 from FIG. 9 forces the SCE priority controls 60 to give highest SCE priority to the SCE command/address register 41 which has the same subscript (e.g. N) as the active line 91, with the lowest valued subscript being given priority over higher valued subscripts for the CPUs. The content of this selected register 41 is outputted to the XI and SP circuits on bus 73. Also controls 60 activate a cancel line 72 to the XI and SP circuits to cancel any request already started in the SCE due to a contending request which previously obtained priority in controls 60, after which the SCE gives that PMC request priority for use of the XI and SP circuits of the command on bus 73 to the XI, SP circuits for the new request. An inhibit signal is provided on line 74 or 75 for the respective PMAX or PMAY which has been selected for the new request while the XI controls are busy with the new request, in order to indicate to the MS controller not to accept any other FP request to this MS array until the XI controls are again available.

Whenever SCE priority is given to an SCE request, it is signalled on line 71 to the MS controller (PMC).

From FIG. 6, the command and address corresponding to an SCE priority selection are provided on output lines 66a and 66b to the PMC in FIG. 9.

Fast paths are configured in or out of the system by signals from a service processor for the system. A scan in control register 70 in FIG. 6 receives the FP configuration signals sent by the service processor to indicate which of fast paths 1 through N are configured currently into the system. Each bit in register 70 represents the configured status of a respective fast path. The FP is configured into the system if its bit is on and is not in the system if its bit is off in register 70. Each fast path status bit signal is outputted from register 70 to the SCE priority controls 60 to indicate whether the fast path is available for use. If any fast path is not available, its forced priority function in controls 60 is inhibited. Also each FP configuration status is outputted on a FP configured line 68 to indicate to the PMC in FIG. 9 if the corresponding fast path is being used in the system.

Whenever a requestor 1 to N is given priority, its output line is activated to set the respective one cycle trigger 61, which an SCE select signal on line 69 for that requestor to the PMC controls in FIG. 9, along with the associated command and address on lines 66a and 66b during that machine cycle.

If the SCE priority controls 60 detect a request for a remote PMAX or PMAY, it selects the request in the priority order previously described and forwards the request to the remote SCE when the comparable CPU(N) register available line 46(N) is active from FIG. 5 of the remote SCE. At that point, the actions of the remote SCE follow the process of local PMA selection as described above.

FIG. 8 illustrates the SCE data path and data advance lines involved in a data transfer through the SCE of a type provided in the prior art. This data transfer will occur only when no fast path is being used for a request. The data transfer controls 81 receive the advance pulses which control the transfer of K number of data units (e.g. doublewords) of a data line fetch being transferred through the SCE, such as from electrical line 94 in the MC controller which receives a signal each time a data unit is to be transferred for a line fetch. The data is received from the MS controller on line 95 through a crosspoint gating function 84 in the SCE, which transfer the units of data to a SCE data bus 86 that sends the data to the requesting CPU, along with the fetch advance signals on line 82 which are forwarded on the output of controls 81 in response to the advance input received by it. The crosspoint gating function 84 also has other operations not particularly pertinent to the subject invention such as handling a castout data line from a CPU under the control of signals on a bus received from the SCE data path control means 67. Likewise, the data may be sent by function 84 to another CPU on bus 87 under control of corresponding fetch advance signals on line 83.

The same crosspoint gating activity can involve a source of data in the remote SCE. A remote main storage or a remote CPU shown in FIG. 1 and FIG. 2 can forward data through a distributed crosspoint network residing at the SCE.

In FIG. 9, the determination of which command will be permitted to be serviced next in the MS controller (PMC) for an accessing operation is determined by the PMC priority controls 90. FIG. 9 illustrates the MS controller (PMC) with an interface for one fast path, i.e. FP(1). However, any number of other fast path interfaces may also be provided to FIG. 9 by also providing the other FP lines in parallel with the lines labeled with FP(1). Thus, the FP(1) connection is described in detail as being representative of each other FP in any system having more than one FP. Only FP(1) is used in a system having only one FP.

An FP(1) request is signalled on the set CMD/ADR line 31B from the fast path request bus port in FIG. 4 to the PMC priority controls 90, where the request contends for PMC service with any other requests to the PMC. The FP(1) request command is simultaneously sent on bus 35B, and the corresponding FP(1) absolute address is then sent on bus 34B. They are respectively provided as inputs to AND gates 103 and 102, which are activated when the PMC priority controls 90 give priority to the FP(1) request being signalled on line 32B by activating a select FP(1) request line 106 to enable AND gates 102 and 103. FP(1) priority select line 106 can only be activated on the machine cycle after the FP(1) request signal on line 32B is received. In this manner the FP command and address are passed respectively through OR circuits 107 and 108 into a command register 109 and an address register 110 in the PMC.

If priority controls 90 cannot accept the FP(1) request on the cycle after it is received, this FP(1) request is lost and its corresponding SCE request on line 71 will later get priority when it is provided. This can occur for one of several reasons: (1) the fast path is configured to be inactive; (2) the inhibit FP request for PMA is active for the SCE; (3) the requested PMA is busy; (4) the request has a check condition associated with it, or (5) the fast path request is for a remote PMA.

If the FP(1) request is selected, a PMC accept signal is provided on line 91 to the SCE simultaneously with the select FP(1) signal on line 106, so that the SCE will not then make the corresponding SCE request on line 71 to controls 90. If the FP(1) request is accepted, the PMC outputs a signal on line 92 or 93 to indicate to the SCE that the requested array, PMAX, or PMAY is busy.

The PMC priority controls 90 provide the following order of priority among simultaneous requests for selecting a request to access its addressed array, PMAX or PMAY:

1. Refresh request,
2. A delayed store request,
3. Fetch request from
   a. SCE,
   b. FP from a remote SCE,
   c. Local FP with the lowest subscript,
4. Store request from the SCE.

Before the PMC receives an SCE request, the SCE priroity controls have resolved the priority order among all of its fetch requests and store requests received from all of the SCE requestors, e.g. CPUs, IOP, and any remote SCE.

A system SCE fetch request is accepted even though a refresh cycle is taking place. The PMC makes this additional wait time transparent to the SCE.

A SCE store request normally has a lower priority than a SCE fetch request except if the store request has been waiting for a PMA access. This can occur when a fetch request is given priority because of a tie between fetch and store requests. If a fetch request completes quickly, e.g. due to a short data transfer, the store request is not delayed again by another fetch request, because when a store request is waiting it is given priority over a new fetch request.

The fetch logic of the PMC in support of a PMA is a two state machine. If the fetch logic is not busy, a new fetch request is accepted. But if the fetch logic is busy, no new fetch request is accepted. While no new fetches are being accepted by a PMA, the respective PMA fetch busy line 92 or 93 to the SCE must be active; it can go inactive two machine cycles before any new fetch request is accepted, in order to provide communication time for the SCE to see that the PMC fetch logic is not busy and present any existing unaccepted SCE fetch request. Due to the communication time, the PMC rejects new FP fetch requests unconditionally for two cycles following the fall of a fetch busy signal on line 92 or 93.

The amount of time during which a SCE fetch is not accepted depends on several conditions. The primary conditions are as follows:

1. The cycle time of the PMA and the length count for the double word transfer.
2. Whether or not the SCE or FP data bus is available for the data transfer.
3. Whether or not the requested array, PMAX or PMAY, is busy.
4. When the SCE sends a release signal or cancel signal to the PMC.

The address in register 110 selects the required MS array, i.e. PMAX or PMAY. Concurrently, the command in register 109 is sent to the selected PMAX or PMAY in order to designate the type of accessing operation the selected PMA is to perform, e.g. fetch for a fast path request.

An FP error detector 111 contains parity check circuits to determine if any error occurred in the FP transmission, and if so an error signal on line 112 indicates to controls 90 to not select the FP request (and instead use the corresponding SCE request).

A length counter 115 determines the amount of time required by the PMC to service its current request. The counter 115 receives a count of the number of requested doublewords as part of the command provided from OR circuit 107.

No FP request signal to controls 90 is accepted while either: (1) the SCE provides an inhibit FP(1) select of PMAX or PMAY on line 75 or 74, respectively, of (2) there is no active signal on a SCE FP(1) configured line 68(1) from the SCE in FIG. 6.

Data transfer controls 131 control the transfer of data accessed from a selected PMA and put into a fetch data register 132 one data unit at a time, e.g. one doubleword per cycle. The data transfer controls 131 are enabled by a signal on bus 133 from PMC priority controls 90, an active SCE FP(1) configured line 68(1), and a signal on the related PMAX or PMAY release line 51 or 52. The length counter 115 gates the data units through controls 131 after a release signal is obtained from line 51 or 52. Counter 115 decrements by one for each doubleword transfer until it reaches zero. The data path to BCE(1) for its requested data is selected in data transfer controls 131 by bus select signals on bus 133. The FP(1) data bus 96 is selected for all data transfers to CPU(1) as long as an FP(1) configured signal is active on line 68(1). Then SCE data bus 95 is selected for data transfers to all requestors other than CPU(1), and for CPU(1) store requests. The doublewords of a data line are gated on FP(1) data bus 96 with timing pulses provided on FP(1) fetch advance line 97, or on SCE data bus 95 with fetch advance pulses provided on line 94.

This is a clocked embodiment. Therefore its operations may be described on a cycle-by-cycle basis using FIGS. 10-14. In each FIG. 10-14, a fetch request is simultaneously made during cycle 1 by CPU1: (1) to the PMC through a fast path, and (2) to the SCE.

FIG. 10 illustrates the situation where the PMC ignores a FP fetch request due to the required PMA being busy when the request is made, but the FP is used for returning the fetched data. In this case, the SCE will handle the request, but the SCE will signal the FP to handle the data transfer directly from the required PMA to the requesting CPU1.

Thus in FIG. 10, when the SCE receives the fetch request from CPU1, it determines that the required PMA is busy and therefore leaves the request in an SCE queue where the request waits for K number of cycles until a required PMA becomes available. Thus at cycle K, the SCE priority circuits give this request a SCE priority cycle for selecting the SCE resources required to handle the request during the next cycle K+1. During cycle (K+1) the SCE sends a command and address for the request to the cross-interrogation (XI) and store protect circuits (SP), and the SCE also signals the PMC to select the fast path for transferring the data for this request. The data will then get transferred to CPU1 several cycles later after the access is completed by the PMC in the required PMA.

In FIG. 11, the PMC accepts the FP request from CPU 1 at the end of cycle 1. There is no contention in this case, and the SCE priority controls 60 are not busy, so that in cycle 2 both FP(1) accepts the request and the SCE controls 60 provide SCE priority for the request. In this case, the SCE in cycle 3 forwards the request to: (1) cross-interrogation (XI) circuits, (2) the store protect (SP) circuits, and (3) the PMC priority controls 90. Cross interrogation and store protect checking continue for a valid request that is still proceeding regardless of whether the data transfer for the request will be done by the FP or the SCE.

In the example of FIG. 11, there is no forced SCE priority select. The undelayed handling of the normal SCE fetch request during cycle 2 avoids the forcing of any SCE priority selection by the PMC acceptance of the FP request, so that the PMC accept signal is then ignored by the SCE. The SCE nevertheless in cycle 3 performs the XI and SP functions and signals the FP to do the data transfer for the request since the FP would not otherwise know that the SCE was not going to transfer the data.

In FIG. 12, the SCE priority circuits are busy during cycle 2 when the SCE priority controls 60 would usually be available to provide a priority cycle for the SCE request. However, the PMC accepts the request, and during cycle 2 the PMC accept signal is received by the SCE. In cycle 3, the SCE is aware it did not accept the request which the PMC had accepted. Then in cycle 3, the SCE gives highest priority to the PMC accept signal to force the SCE priority circuits 60 to recognize that request, and immediately use the XI and SP functions for that request, which is done in cycle 4. Thus in FIG. 12, the PMC accepts the fast path request, and signals this to the busy SCE on cycle 2. The SCE prioritizes this signal on cycle 3 which causes the SCE priority mechanism to forward the address and command for the fetch request to the cross interrogation and store protect circuits (but not to the PMC) in cycle 4. Cross interrogation and store protect checking are performed for this command as if it were a normal SCE fetch request, and the responses from these functions are treated identically to a normal SCE fetch request.

Figure 13:
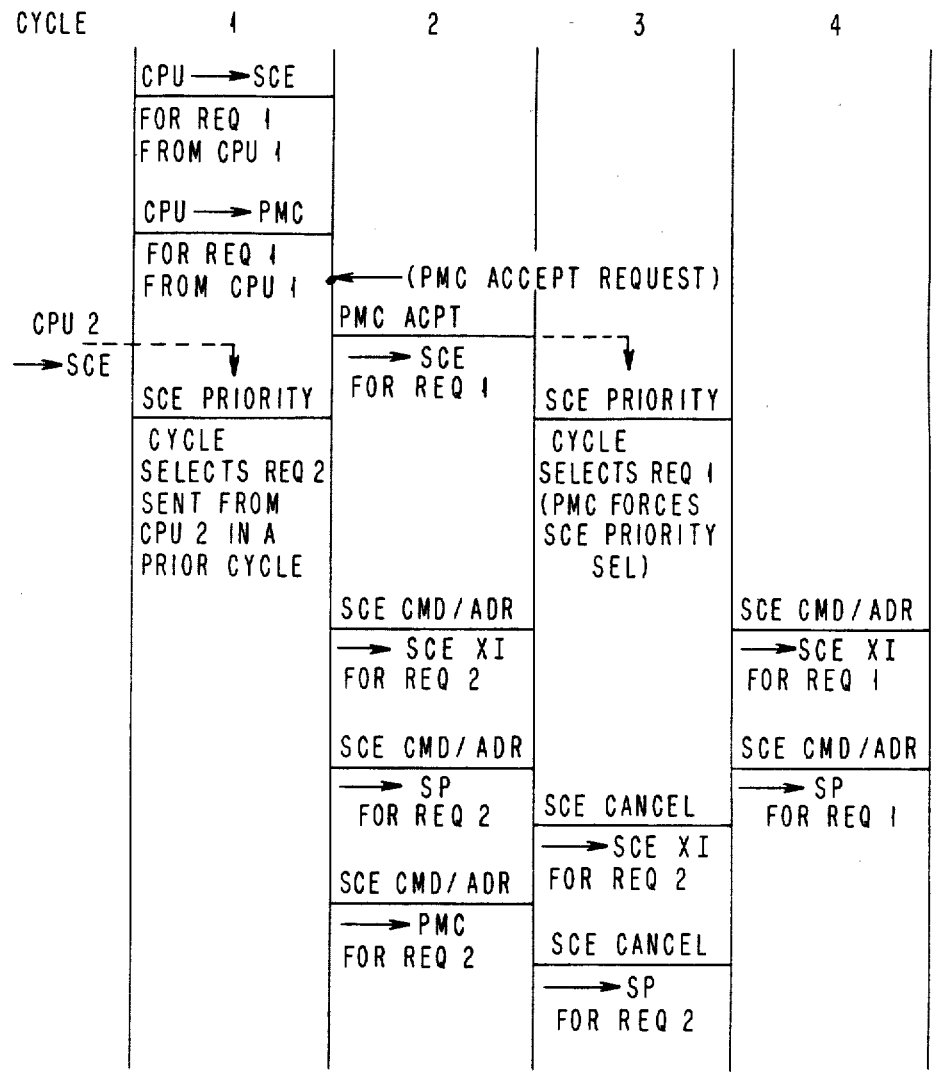
FIG. 13 is a machine cycle timing diagram illustrating a forced SCE operation for an accepted fast path request when the system controller element (SCE) is busy with an earlier concurrent request from another CPU not using a fast path when the acceptance is received, wherein the SCE is forced to give priority for the XI and SP resources on the cycle after receiving the fast path request acceptance, and the SCE cancels the conflicting concurrent request.

FIGS. 13 and 14 illustrate forced SCE contention between a normally higher priority non-FP request from CPU2 with a later FP accepted request from CPU1. That is, the normal SCE priorities of controls 60 give the non-FP request higher priority than the CPU1 request to the SCE, so that the non-FP request gets priority. The FP accept signal is received by the SCE from the PMC, which forces a priority change in controls 60 in order to switch its XI and SP resources to the FP request in cycle 4.

In FIG. 13, a CPU2 non-FP request gets a SCE priority cycle during cycle 1, while in FIG. 14, a CPU2 non-FP request gets a SCE priority cycle during cycle 2. In FIG. 13, the SCE priority cycle in cycle 1 causes cycle 2 to be used by the priority circuits for selecting XI and SP services for the CPU2 request for the same PMA as requested by CPU1, with the result that the SCE priority circuits are not available immediately for use by any SCE request from CPU1 that would normally be done if there were no contention.

In FIG. 13, when the SCE detects the fast path acceptance signal during cycle 2, it issues a cancel signal during cycle 3 to cancel the cross interrogation and store protect selection for the conflicting non-FP request from CPU2 which does not use any fast path, but which remains queued in the SCE for later accessing. The CPU2 request, itself, is not cancelled when it is delayed in the SCE by the forcing of an SCE priority cycle for the CPU1 request during cycle 3, which causes the fast path request from CPU1 to be selected in cycle 4 for using the XI and SP resources. Then during cycle 4 the cross interrogation and store protect circuits begin their operations for the CPU1 request.

In FIG. 14, the non-FP request 2 obtains a SCE priority cycle on cycle 2 before the SCE priority circuitry 60 can respond to the PMC acceptance signal from the FP. Then on cycle 3, the SCE priority circuits 60 respond by forcing priority to the FP request from CPU1. During cycle 4, this causes a cancel signal to be sent to the cross interrogation and store protect circuits for the non-FP CPU2 request, and also in cycle 4 the XI and SP circuits are selected for the FP request from CPU1. The PMC accesses the data for the CPU2 request in paralle, but does not send the data until the SCE later signals a release upon the XI and SP circuits finding no update conflict or storage protect violation.

The PMA priority controls 90 will however only accept an FP request when no SCE request is being received for that PMA. Thus, all FP requests will be ignored in the PMC for a given PMA as long as any delayed SCE request is being provided for that PMA. Hence in the event that both the SCE and BCE send requests to the PMC on the same cycle for the same PMA, the PMC priority circuits will give priority to the request from the SCE. Then the SCE will recognize fetch busy line 92 and/or 93 for any PMA requested by any conflicting fast path request, which can not send a competing request to the PMA on the next cycle.

If CPU2 request had been for a PMA not requested by CPU1 in FIGS. 13 and 14: (1) CPU2 request would also be accepted by the PMC; and (2) the SCE would not issue the SCE CANCEL to X1 and SP. Both requests would concurrently be serviced by both the PMC and the SCE with concurrent data transfers from different PMAs on different data paths.

If a FP request is not accepted by the PMC when it is made, no FP accept signal is sent to the SCE, and the request is not force selected in the SCE. Instead, the request continues through the SCE's normal priority controls and is selected according to the rules of priority in the SCE. At the time that any SCE request is selected for the FP CPU1, the SCE will detect that the request is for CPU1 with the fast path; and if the fast path is enabled the SCE forwards the request to the PMC to transfer the data for the request. When the data for a request is returned through the FP, no data path is then allocated within the SCE, and the SCE does not wait for advances for that request from the PMC. During this time, the SCE data path is available for transferring data for some other request, e.g. non-FP data to CPU2.

If the fast path is reconfigured out of the system, the SCE will send the data for all requests through the SCE.

If it is necessary to transfer requested data from the cache of another CPU that already has the data, the SCE data path is selected. Since CPU1 is able to receive data on either its fast path port or its SCE port, the SCE controls do not need to know that the data transfer will use the fast path.

The SCE sends a one cycle signal to the PMC when the necessary SCE XI and SP checking for a fetch or store request to a particular PMA has been completed so that PMA accessing may begin for a fetch or store request. In the case of a fetch request, the data may be transferred through the SCE or the fast path but store requests transfer their data only through the SCE data bus in this embodiment.

The PMC will register these signals to indicate which of the two data paths is to be used for each request from CPU1. As in the case of the cancel lines, the SCE does not need to remember whether a fetch request being released is for the fast data path or the SCE data path, since the PMC will then make the selection.

The two SCE inhibit lines to the PMC inhibit requests from the fast path to each of two PMAs. As long as an inhibit line corresponding to a given PMA is active, the PMC will ignore any fetch request from the fast path for that PMA. The inhibit prevents a fast path request from beginning a fetch access for which it will not be possible to have the SCE begin cross interrogation. An inhibit line remains active until the required XI and SP resources become available. In the event that a fast path request is inhibited, it will not be accepted by the PMC, but it will be entered into the SCE's priority queue, and the SCE will resend the request at a later time to the PMC for accessing.

Figure 7A:
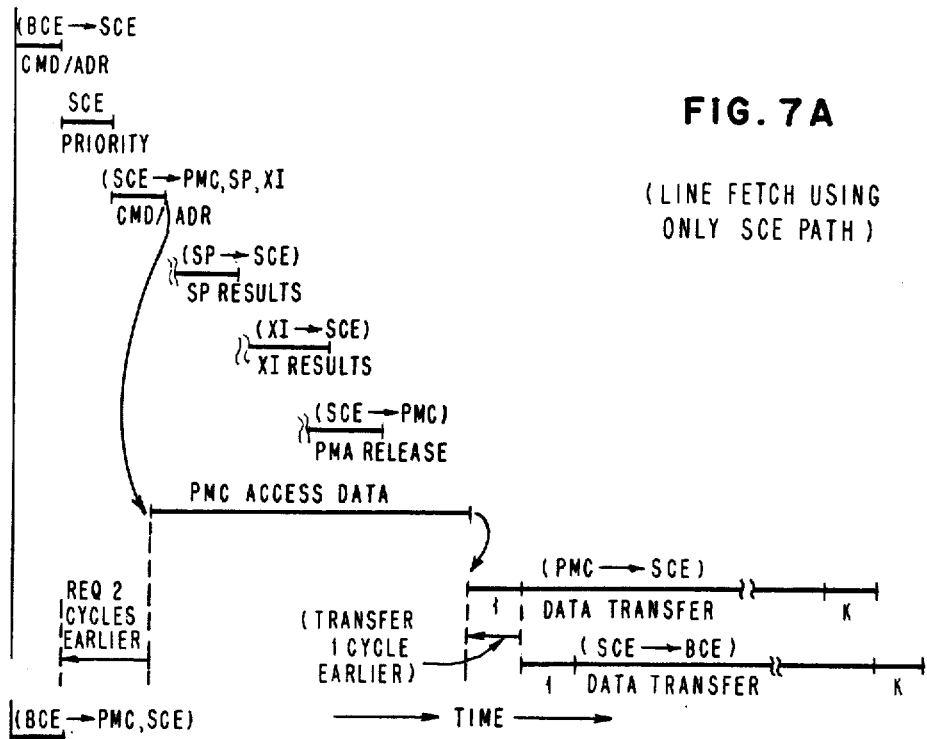
FIG. 7A is a timing diagram for a line fetch access using only the SCE request path and the SCE data path.
Figure 7B:
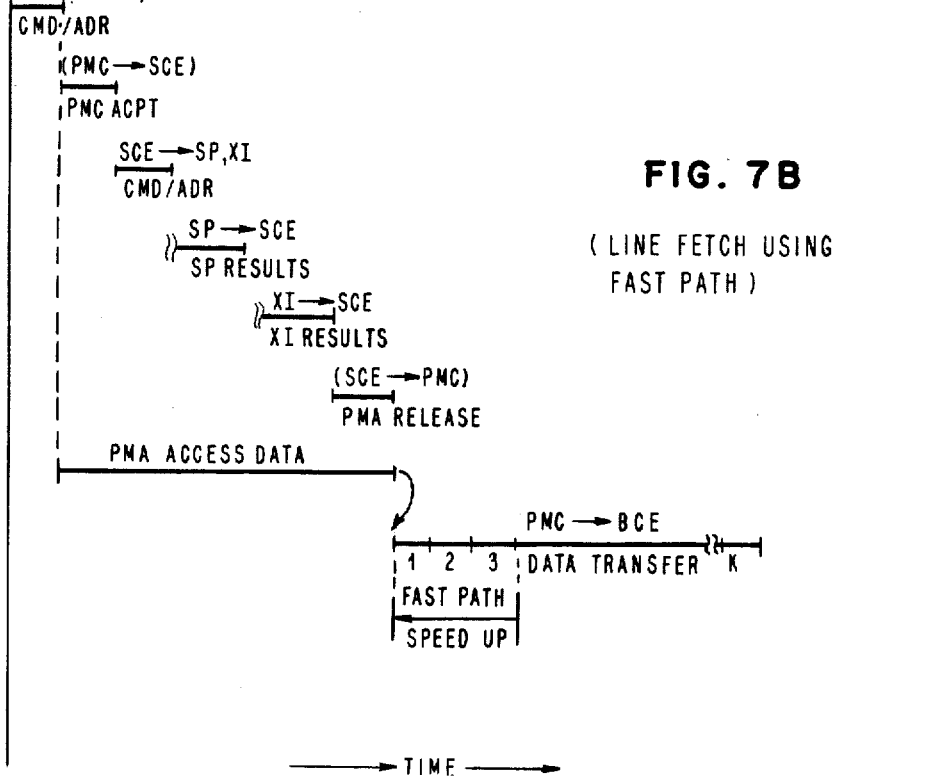
FIG. 7B is a timing diagram for a line fetch access which is accepted from a fast path request bus and returns data on the fast path data bus.

FIGS. 7A and 7B illustrate timing diagrams showing the advantage of the fast path operation over line fetches not using the fast path, i.e. using only the request and data paths through the SCE to main storage.

FIG. 7A illustrates SCE fetch operation timing without the fast path. A CPU request is transmitted by its BCE to the SCE as a command and an address (CMD?ADR). This is done in one cycle. The second cycle is by the SCE priority circuits for this request if there is no contention. In the third cycle, the SCE forwards this command/address to the PMC while the SCE is also forwarding this command/address to he storage protect and cross interrogate circuits associated with the SCE. In the fourth cycle, the PMC begins its access operations in the requested array, PMAX or PMAY. While the PMC access functions are busy for the request, the cross interrogate (XI) and storage protect (SP) functions are taking place for the same request in the SCE. As soon as the XI and SP functions are completed successfully (i.e. no conflict detected in another CPU), a release signal is sent for this request from the SCE to the PMC. However, if the cross interrogate or storage protect checking is unsuccessful (i.e. finds a conflicting line in another CPU), then no PMA release signal is sent and the SCE then cancels the accessing being performed by the PMC for this request (which will be reissued later by the SCE after the conflict is resolved).

When the PMC accessing is completed (assuming a release signal is provided), the accessed data transfer is started from the PMC to the SCE in units of the requested line, e.g. doublewords.

One cycle after the access data transfer begins from the PMC to the SCE, the SCE can begin forwarding the data to the BCE of the processor making the request. The units of transfer are sent from the PMC to the SCE, and then from the SCE to the BCE, until all units of the requested fetched line are received by the BCE of the requesting CPU.

FIG. 2B illustrates operations for a line fetch by a CPU using the fast path, which is CPU1 in FIG. 1. During the first cycle, the fetch request is sent as a command and an address (CMD/ADR) simultaneously on two ports to both (1) the SCE, and (2) the PMC via the fast path. During the second cycle, the PMC communicates its acceptance to the SCE, if the PMC is able to accept the request. In the third cycle, the SCE forwards the request to its storage protect and cross interrogate functions.

Note in FIG. 2B that the PMA data access begins on the second cycle while the PMC is communicating its acceptance to the SCE. Note also that the PMA access in FIG. 2B therefore begins two cycles earlier than the PMC access began in FIG. 2A, which is shown in FIG. 2B.

Assuming that the SP and XI functions are successful, the SCE communicates a PMA release signal to the PMC before the data access is completed. Then on the first cycle after the PMA access is completed, it can immediately begin transferring the data on the fast path to the requesting processor. Note that the processor gets the data on the fast path one cycle earlier after the PMA access is completed. Accordingly, the net speed up in FIG. 7B over FIG. 7A is represented by a "fast path speed up" shown as three cycles in FIG. 7B. This is the sum of the two cycle saving in starting the PMC access and the one cycle saving in the data transfer to the processor.

Although this invention has been shown and described with respect to particular embodiments thereof, it will be obvious to those skilled in the art that the foregoing and other changes and omissions in the form and detail of the present invention may be made therein without departing from the spirit and scope of the invention, which is to be limited only as set forth in the following claims.

Having thus described our invention, what we claim as new and desire to secure by Letters Patent is:

1. In a data processing system having at least one central processing unit (CPU), a system controller element (SCE) for connecting the CPU to a main storage (MS) controller that controls accesses to a system main storage (MS), each CPU having a buffer control element (BCE) for providing CPU fetch and store requests to the SCE, the SCE containing storage protection (SP) means for checking for storage protection violations, an I/O processor also connected to the SCE for providing I/O requests to the MS controller, further comprising:
  fast path (FP) bussing means connected between the MS controller and the BCE of the CPU for transferring CPU fetch requests directly to the MS controller,
  dual ports in the CPU respectively connected to the SCE and to the FP bussing means for simultaneously providing a CPU fetch request to both the SCE and the FP bussing means, the dual ports providing two separate physical connections receiving each CPU fetch request,
  MS priority means in the MS controller for receiving main storage requests from the FP bussing means and from the SCE for determining which request next accesses MS, the MS priority means immediately initiating an access in MS for the FP fetch request if no higher priority request conflicts with the FP fetch request, the MS priority means sending an FP accept signal to the SCE when a FP fetch request is selected by the MS priority means for accessing MS in order to indicate to the SCE that accessing has already begun for that request,
  SCE request priority means for receiving each storage request from one of the dual ports of the CPU and from the I/O processor for determining which request the SCE will next provide to the MS controller,
  means for forcing the SCE to next handle a CPU fetch request for SP violation checking in response to the SCE receiving an FP accept signal from the MS controller.

2. In a data processing system having at least one central processing unit (CPU), a system controller element (SCE) for connecting the CPUs to a main storage (MS) controller that controls accesses to a system main storage (MS), each CPU having a buffer control element (BCE) for providing CPU fetch and store requests to the SCE, the SCE containing storage protection (SP) means for checking for storage protection violations, and I/O processor also connected to the SCE for providing I/O requests to the MS controller, further comprising:
  fast path (FP) data bussing means connected between the MS controller and the BCE of at least one CPU for transferring signals for a CPU fetch request directly to the MS controller,
  dual ports in the CPU respectively connected to request and data bussing means in the SCE and to the FP data bussing means,
  SCE request priority means for receiving each storage request from the CPU and from the I/O processor for determining which request the SCE will next forward to the MS controller before SCE processing is completed for the forwarded request,
  MS storage request means to determine which storage request will next acces main storage to immediately begin accessing each received storage request when it has no higher priority contending request,
  SCE release means for determining when all SCE processing is completed for a forwarded request,
  means in the MS controller for selecting the FP data bussing means for transmitting to the CPU data accessed in MS for a storage request received by the SCE from the CPU.

3. In a data processing system as in claims 1 or 2, further comprising:
  a second CPU in the MF having a BCE with request and data bussing means connected to the SCE, no fast path being connected to the second CPU, storage performance of the second CPU being improved by reduced contention in the SCE due to some requests of the first CPU using the fast path instead of contending busses in the SCE.

4. In a data processing system as defined in claims 1 or 2, further comprising:
  FP error detection means for detecting a failure in the fast path,
  means for rejecting the FP request with the request being forwarded from the dual port to the SCE.

5. In a data processing system defined in claim 3, further comprising:
  plural MS arrays in the MS storage, the SCE data bussing means transferring data from one MS array to the second CPU simultaneously while the FP data bussing means is transferring data to the CPU connected to the FP.

6. In a multiprocessor system (MP) having plural central processing units (CPUs), a system controller element (SCE) for connecting the CPUs to a main storage (MS) controller that controls accesses to a system main storage (MS), each CPU having a buffer control element (BCE) for providing CPU fetch and store requests to the SCE, the SCE containing storage protection (SP) means and cross-interrogation (XI) means for checking for storage protection violations and any conflicting data in each other processor on each missed request in a cache directory, an I/O processor also connected to the SCE for providing I/O requests to the MS controller, further comprising:
  fast path (FP) bussing means connected between the MS controller and the BCE of at least one CPU for transferring CPU fetch requests directly to the MS controller, dual ports in the one CPU respectively connected to the SCE and to the FP bussing means for simultaneously sending a fetch request by the one CPU to both the SCE and the FP bussing means, MS priority means in the MS controller for receiving main storage requests from the FP bussing means and from the SCE for determining which request next accesses the MS, immediately initiating an access in MS for the FP fetch request if no higher priority request conflicts with the FP fetch request, the MS priority means sending an FP accept signal to the SCE when a FP fetch request is selected by the MS priority means for accessing in MS in order to indicate to the SCE that accessing has already begun for that request, SCE request priority means for receiving each storage request from each CPU and from the I/O processor for determining which request the SCE may next forward to the MS controller before SCE processing is completed for the previously forwarded request, MS request cancelling means in the SCE for sending a cancelling signal to MS for cancelling any transmission of accessed data for the fetch request in response to an adverse determination for the fetch request by the XI or SP means in the SCE, SCE release means for determining when SCE processing is completed for a request and then sending a release signal to the MS controller to enable it to send the accessed data to the requestor, FP selection means in the MS controller for selecting the FP bussing means for directly transmitting to the one CPU data accessed in MS when no adverse determination occurs in the SCE for the fetch request.

7. In a MP as defined in claim 6, further comprising:
another fast path (FP) bussing means connected between the MS controller and the BCE of a second CPU for transferring the second CPU fetch requests directly to the MS controller, dual ports in the second CPU, respectively connected to the SCE and to the second FP bussing means for simultaneously sending a fetch request by the second CPU to both the SCE and the second FP bussing means, MS priority means in the MS controller for receiving main storage requests from each FP bussing means and from the SCE for determining which request next accesses the MS, the MS priority means immediately initiating an access in MS for a FP fetch request if no higher priority request conflicts with the FP fetch request, the MS priority means sending an FP accept signal to the SCE when a corresponding FP fetch request is selected by the MS priority means for accessing in MS in order to indicate to the SCE that accessing has already begun for that request, SCE request priority means for receiving each storage request from each CPU and from the I/O processor for determining which request the SCE may next forward to the MS controller before SCE processing is completed for the forwarded request, MS request cancelling means in the SCE for sending a cancelling signal to MS for cancelling any transmission of accessed data for the fetch request in response to an adverse determination for the fetch request by the XI or SP means in the SCE, SCE release means for determining when SCE processing is completed for a request and then sending a release signal to the MS controller to enable it to send the accessed data to the requestor, FP selection means in the MS controller for selecting the FP bussing means for directly transmitting to the requesting CPU data accessed in MS when no adverse determination occurs in the SCE for the fetch request.

8. In a MP as defined in claim 6, in which the MS priority means further comprises:
means for providing higher priority to requests received from the SCE than for requests received from a fast path in order to force the MS controller to handle requests delayed in the SCE before handling any new request from a fast path to obtain a required order among requests received by the MS controller.

9. In a MP as defined in claim 8, further comprising:
a fast path request provided from one of the dual ports not being accepted by the MS controller if the MS controller is busy during the cycle the request is received by the MS controller from a fast path, the SCE handling each request received from the other of the dual ports when the fast path request from the one dual port is not accepted by the fast path.

10. In a MP as defined in claim 6, in which the SCE further comprises:
SCE inhibit means being active while the XI means or SP means is active for a request, the SCE inhibit means providing an inhibit signal to the MS controller for inhibiting the MS controller from accepting any FP request while the inhibit signal is active in order to maintain a required priority sequence among all requests provided to the MS controller.

11. In a MP as defined in claim 10, in which the SCE inhibit means further comprises:
MS storage array indicating means for indicating the MS storage array to which a request is directed for which the XI means or SP means is currently active, the inhibit signal to the MS controller indicating the inhibit signal is applicable only to the indicated MS storage array in order to allow the MS controller to accept FP requests to any other MS storage array not identified by the inhibit signal.

12. In a multiprocessor system (MP) having a main storage (MS) accessible by a plurality of central processing units (CPUs) through a system common path for cross-interrogating (XIing) each request by a CPU for existence of request data which has been updated in another CPU, and then transferring the updated data to the requesting CPU, a MS controller for receiving the requests from the common system path, comprising:
a separate path from one of the CPUs to the MS controller, the separate path receiving each fetch request from the one CPU when that fetch request is provided to the system common path, MS priority means for receiving each fetch request from the separate path and immediately starting an accessing of the requested data in MS if a required MS array is then available for accessing, MS acceptance means providing an MS accept signal to the system common path that the requested data will be transmitted to the one CPU on the separate path in order to enable the common path to transfer data for another request from any CPU, inhibit means for inhibiting the MS priority means from accepting another request from the separate path until the requested data has been found not to have been updated in another CPU.

13. In a MP having a common path and a separate path as defined in claim 12, further comprising:

common priority means in the system common path for receiving each request received by the system common path and receiving each MS accept signal to force the common priority means to signal to the MS controller to select the separate path (instead of the common path) to transfer the requested data from MS to the one CPU and to bypass data path resources in the common path for use by another request, the forced operation of the common priority means occurring when it is busy when it would normally respond to the same fetch request received by the system common path.

14. In a multiprocessor system (MP) having plural central processing units (CPUs), a plurality of system controller elements (SCEs) for connecting a subset of the CPUs directly to a local main storage (MS) controller that controls accesses to a respective part of system main storage (MS), a local SCE being connected to a subset of CPUs, but each other SCE being a remote SCE, each CPU having a buffer control element (BCE) for providing CPU fetch and store requests to the connected SCE, each SCE containing storage protection (SP) means and cross-interrogation (XI) means for checking for storage protection violations and any conflicting data in each other processor on each missed request in a cache directory, a respective I/O processor also connected to each SCE for providing I/O requests, fetch requests to MS being provided to a local SCE by any one of a plurality of requestors, including any connected CPU, I/O processor or remote SCE, further comprising:

fast path (FP) bussing means connected between a MS controller and a requestor for transferring fetch requests directly from the requestor to the local MS controller, dual ports in the requestor respectively connected to a local SCE and to the FP bussing means for simultaneously sending a fetch request by the requestor to both the SCE and the FP bussing means, MS priority means in local MS controller for receiving fetch requests from the FP bussing means and from the SCE for determining which request is next provided to the local MS controller by the local SCE, immediately initiating an access in the local part of MS for the FP fetch request if the request is accepted by the local MS controller, the MS priority means sending an FP accept signal to the local SCE in order to indicate to the local SCE that accessing has already begun for that request.

15. In an MP as defined in claim 14, further comprising:

MS storage array indicating means for each SCE for indicating a MS storage array to which a fetch request is directed, cross-interrogation (XI) means storage protect (SP) means being activated by a local SCE in response to either the request to the SCE or the FP accept signal being sent from the SCE, an inhibit signal to the local MS controller for indicating the accepted request is applicable only to the indicated MS storage array in local MS storage.

16. In a MP as defined in claim 15, further comprising:

MS array detecting means in each MS controller and in each SCE for detecting if the MS storage array addressed by the fetch request is in the local part of MS or a remote part of MS, FP refusing means in each MS controller servicing a FP to refuse any fetch request from a FP for a MS array in a remote part of MS, the SCE receiving the fetch request forwarding the request to the remote SCE connected to the part of MS having the addressed MS array.

* * * * *